Aug. 12, 1958   M. RICKS   2,847,656
PROTECTIVE ALARM SIGNAL FOR MOTOR VEHICLES
Filed Nov. 29, 1957
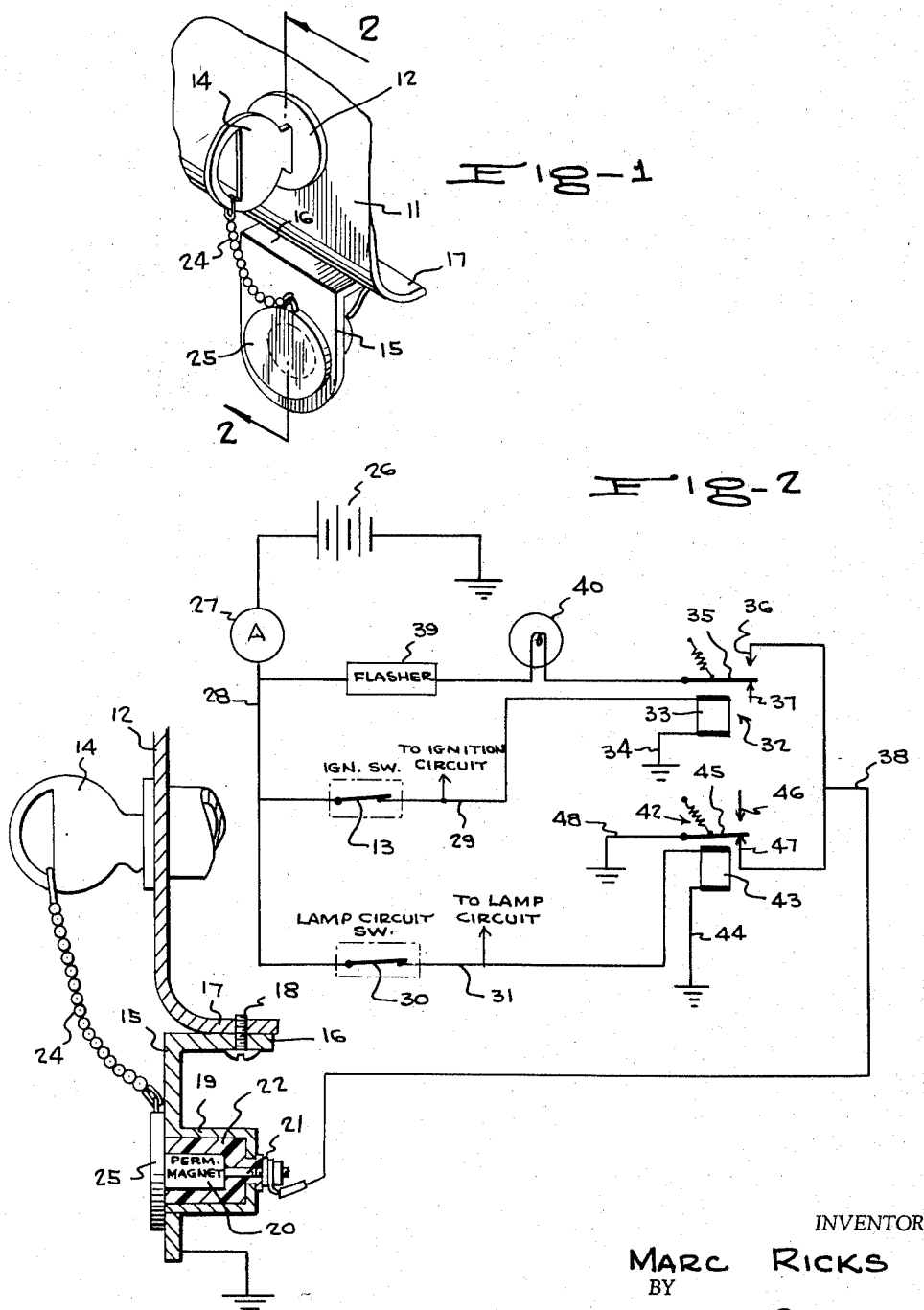
INVENTOR.
MARC RICKS
BY
McMorrow, Berman & Davidson
ATTORNEYS

2,847,656

PROTECTIVE ALARM SIGNAL FOR MOTOR VEHICLES

Marc Ricks, Berkeley, Calif.

Application November 29, 1957, Serial No. 699,587

3 Claims. (Cl. 340—52)

This invention relates to alarm devices, and more particularly to a protective signaling system for motor vehicles to notify the operator of a motor vehicle that the ignition key has been left in the ignition lock or that the vehicle lamps have been left energized.

A main object of the invention is to provide a novel and improved automatic warning system for motor vehicles, said system involving simple parts, being easy to install, and providing a dependable indication to warn the operator of a motor vehicle that he has left the ignition key in the ignition lock or that he has left the lamp circuits of the vehicle in an energized condition.

A further object of the invention is to provide an improved automatic warning system to notify the operator of a vehicle when he is about to leave the vehicle that the ignition key has been left in the ignition lock or that he has left the motor vehicle lamp circuits in an energized condition, the system involving inexpensive components, being easy to maintain in an operating condition, and serving to greatly reduce the risk of theft of a motor vehicle or of the running down of the vehicle battery due to the inadvertent retention of the energization of the vehicle lamps when the operator leaves the vehicle.

Further objects and advantages of the invention will become apparent from the following description and claims, and from the accompanying drawings, wherein:

Figure 1 is a perspective view of a fragmentary portion of the instrument panel of a motor vehicle, said portion including the ignition lock of the vehicle, showing the circuit closing means of a warning apparatus according to the present invention installed adjacent the ignition lock and illustrating the manner in which the magnetic medallion associated with the ignition key is engaged with the circuit-closing element to establish the alarm circuit.

Figure 2 is a wiring diagram showing the electrical connections of an alarm circuit according to the present invention, controlled by the structure shown in Figure 1.

Referring to the drawings 11 designates the instrument panel of a conventional motor vehicle, said instrument panel being provided with the usual ignition lock 12 which is adapted to open and close an ignition switch 13 responsive to the rotation of the ignition key 14 fitting the lock 12.

Designated at 15 is a bracket member having a top flange 16 adapted to be secured to the horizontal bottom flange 17 of the instrument panel 12 in the manner illustrated in Figure 2, as by means of a plurality of fastening screws 18 engaged through flange 16 and threadedly engaged in flange 17.

The vertical main body portion of the bracket member 15 is formed with a cup-like receptacle 19 in which is centrally mounted a generally cylindrical contact member 20 having a shank portion 21 which extends rearwardly through the rear wall of the cup-like member 19, said cup-like member containing a quantity of insulating material 22 which surrounds the contact member 20 and insulates said contact member from the cup-like member 19.

It is understood that the cup-like member 19 may be integrally formed on the bracket member 15 or may be suitably secured thereto, as by welding, or the like, both of the members 15 and 19 being made of conductive metal, and being thus grounded to the frame of the motor vehicle by the connection of flange 16 to flange 17 of the instrument panel.

As shown in Figure 2, the end of the contact member 20 is substantially flush with the front surface of the vertical depending portion of bracket member 15. The ignition key 14 has secured to its handle portion a depending flexible chain 24 to the end of which is attached a medallion 25 of suitable magnetic metal, such as soft iron, or the like. The contact member 20 is permanently magnetized, being formed of suitable permanently magnetized steel, for example, of Alnico, whereby the medallion 25 will be strongly attracted to the exposed end of the contact member 20 and will be held thereagainst in the manner shown in Figure 2.

As shown in Figure 2, the medallion 25 is of a diameter substantially greater than that of the cup-like member 19, so that the medallion 25 will electrically connect the contact element 20 to the bracket member 15 when held thereagainst by magnetic attraction in the position illustrated in Figure 2.

Designated at 26 is the vehicle battery, having one grounded terminal, and having its other terminal connected through the usual ammeter 27 to the wire 28. A wire 29 is connected through the ignition switch 13 to the wire 28, and the ignition circuit of the motor vehicle is connected to the wire 29, as shown in Figure 2. Similarly, a motor vehicle lamp circuit is connected through a manually controlled switch 30 to said wire 28. For example, the switch 30 may control any part of the normal headlamp circuit or may control the entire headlamp circuit. Designated at 31 is the headlamp energizing wire which is connected through the control switch 30 to the battery wire 28.

Designated generally at 32 is a first relay having a winding 33. One terminal of the winding 33 is grounded, as by a wire 34. The wire 29 is connected to the other terminal of the wire 33, whereby the relay winding 33 is energized when the ignition switch 13 is closed. Relay 33 is provided with the pivoted armature 35 and with the upper and lower contacts 36 and 37. The armature 35 is biased upwardly so that when winding 33 is deenergized the armature 35 engages the upper contact 36. Contact 36 is connected to a wire 38, which in turn is connected to the terminal shank 21 of contact element 20. As shown in Figure 2, the shank 21 is insulated from the grounded cup-like housing 19 by the body of insulation 22.

A suitable electrical alarm circuit, for example, a flasher 39 and signal lamp 40 are connected between the battery wire 28 and the armature 35. Thus, flasher 39 and lamp 40 are in series between armature 35 and wire 28, and will become energized when relay winding 33 becomes deenergized and when the contact element 20 is connected to ground by the medallion 25. Thus, if a vehicle operator opens the ignition switch 13 but forgets to remove the key 14, the alarm circuit comprising the flasher 39 and lamp 40 becomes energized as soon as the ignition switch 13 is opened due to the deenergization of relay winding 33, and due to the engagement of the armature 35 with its upper contact 36. As will be seen from Figure 2, an energizing circuit for the alarm device is thus completed comprising the battery wire 28, flasher 39, lamp 40, armature 35, contact 36, wire 38, contact element 20, medallion 25, and the grounded bracket 15.

The energization of the alarm device notifies the operator that he has forgotten to remove the key, and therefore the operator removes the key 14, thus disengaging the medallion 25 from its bridging position across contact element 20 and bracket element 15. With the medallion 25 removed, the energizing circuit for the alarm elements is broken.

Designated generally at 42 is a second relay comprising a relay winding 43 having one terminal thereof grounded, as by a wire 44, the other terminal thereof being connected to the wire 31. Relay 42 has the pivoted armature 45 and the upper and lower contacts 46 and 47. When the winding 43 is energized, the armature 45 engages the lower contact 47, as shown in Figure 2. Armature 45 is grounded, as by wire 48. Contact 47 is connected to the wire 38.

Winding 43 is energized whenever the lamp circuit switch 30 is closed, since the winding 43 is connected in parallel with the lamp circuit. Thus, if relay 33 should become deenergized while the switch 30 is closed, an energizing circuit for the flasher 39 and lamp 40 will be completed, as follows: Battery wire 28, flasher 39, lamp 40, armature 35, contact 36, wire 38, contact 47, armature 45, wire 48 and ground. Thus, if the operator should remove the ignition key 14, but forget to open the lamp circuit switch 30, the signal device comprising the flasher 39 and lamp 40 will become energized, warning the operator that he has forgotten to deenergize the vehicle lamp circuits controlled by switch 30. This indication will not be given if the ignition switch 13 is closed, since this energizes relay winding 33, disengaging armature 35 from contact 36. However, as above explained, if ignition switch 13 should be opened with the key left in the ignition lock 12, with medallion 25 in the position shown in Figure 2, the energizing circuit for the signal elements 39 and 40 will be completed, providing the warning indication.

While a specific embodiment of an improved warning apparatus for motor vehicles has been disclosed in the foregoing description, it will be understood that various modifications within the spirit of the invention may occur to those skilled in the art. Therefore, it is intended that no limitations be placed on the invention except as defined by the scope of the appended claims.

What is claimed is:

1. A warning apparatus for a motor vehicle provided with a battery having one terminal thereof grounded to the vehicle frame and having the other terminal thereof ungrounded, a key-controlled ignition switch operable by a key from an open position to a closed position, and an ignition circuit connected to said ungrounded terminal through said switch, said apparatus comprising an ignition key operatively engageable in said switch, a body of magnetic metal secured to and depending from said key, a permanently magnetized contact element insulated from the vehicle frame mounted subjacent said switch in a position to be engaged by said body, said body being sufficiently large to electrically connect said contact element to the frame of the vehicle when the key is in the switch, a relay having its winding connected between the vehicle frame and said ungrounded terminal through said switch, said relay having a pair of contacts which are closed when said winding is deenergized and open when the winding is energized, and an electrical signal circuit connected from the ungrounded terminal of the battery through said contacts of said relay to said contact element and adapted to be energized when the ignition key is in said switch and said switch is open.

2. A warning apparatus for a motor vehicle provided with a battery having one terminal thereof grounded to the vehicle frame and having the other terminal thereof ungrounded, an ignition lock, and an ignition switch controlled by said lock, said apparatus comprising an ignition key operatively engageable in said lock and operable to open and close said switch, a body of magnetic metal, flexible means connecting said body to said key, a permanently magnetized contact element insulated from the vehicle frame mounted subjacent said lock in a position to be engaged by said body, said body being sufficiently large to electrically connect said contact element to the frame of the vehicle when the key is in the lock, a relay having its winding connected between the vehicle frame and said ungrounded terminal through said switch and having a pair of contacts which are closed when said winding is deenergized and open when the winding is energized, and an electrical signal circuit connected from the ungrounded terminal of the battery through said contacts of said relay to said contact element and adapted to be energized when the ignition key is in switch-opening position in said lock.

3. A warning apparatus for a motor vehicle provided with a battery having one terminal thereof grounded to the vehicle frame and having the other terminal thereof ungrounded, an ignition lock, an ignition switch controlled by said lock, said apparatus comprising an ignition key operatively engageable in said lock and operable to open and close said switch, a body of magnetic metal, flexible means connecting said body to said key, a permanently magnetized contact element insulated from the vehicle frame mounted subjacent said lock in a position to be engaged by said body, said body being sufficiently large to electrically connect the contact elements to the frame of the vehicle when the key is in the lock, a relay having its winding connected between the vehicle frame and said ungrounded terminal through said switch and having a pair of contacts which are closed when said winding is deenergized and open when the winding is energized, and an electrical signal circuit connected from the ungrounded terminal of the battery through said contacts of said relay to said contact element and adapted to be energized when the ignition key is in switch-opening position in said lock, said vehicle having a lamp circuit, a control switch, circuit means including said control switch connecting said lamp circuit to the ungrounded battery terminal, a second relay having a pair of contacts which are open when the second relay is deenergized and closed when said second relay is energized, means connecting the winding of said second relay between the vehicle frame and said ungrounded battery through said control switch, and circuit means connecting said signal circuit from the ungrounded terminal of the battery to the vehicle frame to the first-named pair of contacts and through the second-named pair of contacts.

No references cited.